INVENTOR.
MAX PALEVSKY
BY
Byard G. Nilsson
ATTORNEY

Aug. 1, 1961 M. PALEVSKY 2,994,477

DIGITAL INTEGRATORS

Filed Aug. 27, 1956 4 Sheets-Sheet 2

INVENTOR.
MAX PALEVSKY

BY

Byard G. Nilsson

ATTORNEY

| DIGIT SIGNIFICANCE | $\frac{1}{2}$ | $\frac{1}{4}$ | $\frac{1}{8}$ | $\frac{1}{16}$ | $\frac{1}{32}$ | $\frac{1}{64}$ | |
|---|---|---|---|---|---|---|---|
| | 0 | 1 | 1 | 1 | 0 | 1 | = 29/64 |
| + | 0 | 0 | 0 | 0 | 1 | 0 | = 1/32 |
| | [0] | 1 | 1 | 1 | 1 | 1 | = 31/32 |
| + | 0 | 0 | 0 | 0 | 1 | 0 | = 1/32 |
| $+\Delta Z_{1/2}$ ← | [1] | 0 | 0 | 0 | 0 | 1 | = 33/64 |

| DIGIT SIGNIFICANCE | $\frac{1}{2}$ | $\frac{1}{4}$ | $\frac{1}{8}$ | $\frac{1}{16}$ | $\frac{1}{32}$ | $\frac{1}{64}$ | |
|---|---|---|---|---|---|---|---|
| | 1 | 0 | 0 | 0 | 1 | 1 | = − 29/64 |
| + | 1 | 1 | 1 | 1 | 1 | 0 | = − 1/32 |
| | [1] | 0 | 0 | 0 | 0 | 1 | = − 31/64 |
| + | 1 | 1 | 1 | 1 | 1 | 0 | = − 1/32 |
| $-\Delta Z_{1/2}$ ← | [0] | 1 | 1 | 1 | 1 | 1 | = − 33/64 |

INVENTOR.
MAX PALEVSKY
BY Byard G. Nilsson
ATTORNEY 2,994,477

DIGITAL INTEGRATORS

Max Palevsky, Los Angeles, Calif., assignor to The Bendix Corporation, a corporation of Delaware Filed Aug. 27, 1956, Ser. No. 606,337
8 Claims. (Cl. 235—152)

This invention relates to digital integrators for performing mathematical computation including the analysis of differential equations.

Computers employing digital integrators have previously been proposed. In the operation of such computers, a number of integrators are ordinarily provided which may be variously interconnected to produce the solution of different problems. Computers which employ digital integrators are particularly useful in the solution of differential equations and are, therefore, termed digital differential analyzers.

A basic digital integrator, and a manner of interconnecting several such integrators to effect the solution of various problems, is shown and described in a patent application entitled "Digital Differential Analyzers," Serial No. 147,862, filed March 6, 1950, now Patent No. 2,841,328 by Steele et al. Other literature on the operation and interconnection of digital integrators includes an article which appeared in Aeronautical Engineering Review, February 1954, volume 13, No. 2, entitled "The Decimal Digital Differential Analyzer," and an article entitled "Design Features of Current Digital Differential Analyzers" published in the Convention Record of the IRE, of the 1954 Convention, part 4, entitled "Electronic Computers and Information Theory," beginning on page 87.

Although an extremely useful function of differential analyzers is the solution of differential equations, these computers may be programmed to effect other computations as well, as taught in the prior art including the above references.

A basic digital integrator of the prior art may be considered to consist of two storage registers, usually termed an R register and a Y register. The Y register serves to register the value of a dependent quantity Y with variations in the value of an independent quantity X. In the operation of the integrator, a discrete variation in the independent quantity X will cause the content of the Y register to be added into the R register. Repeated variations in the independent quantity may cause the R quantity of the R register to periodically reach a predetermined value, at which time an output signal will be produced and the R register will return to zero. With each such output signal produced, a uniform digital increment in the output quantity is indicated.

In a graphic representation, which may be used to illustrate this concept, the dependent variable Y of a mathematical function is plotted as ordinate and the independent variable X of the function is plotted as abscissa. The output quantities are considered as units of area under the graph of the function, and thus, the accumulation of these overflows results in an integration of the function. In the operation of systems of this type, the R register often contains a numerical value after a cycle of computation. This value has not produced any output quantity and, therefore, constitutes a round-off of the output quantity which may create a substantial error.

In general, the present invention provides a digital integrator capable of providing output signals from its registers representative of different magnitudes of value. In such as system, the round-off errors resulting from numerical values remaining in the registers after each cycle of computation are substantially reduced because values otherwise incapable of producing an output signal from a register may produce such a signal.

An object of this invention is to provide an improved digital integrator.

Another object of this invention is to provide a digital integrator having reduced round-off error.

Another object of this invention is to provide a digital integrator capable of more accurate computation which does not require a substantial increase in component parts.

Other and incidental object and features of this invention will appear from the following description with reference to the drawings in which.

Figure 1:
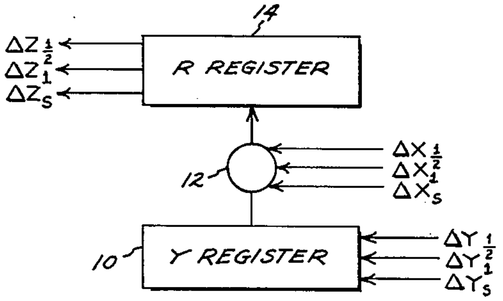
FIGURE 1 is a symbolic representation of an embodiment of a digital integrator constructed according to this invention.

Referring now to FIGURE 1, there is shown a Y register 10 connected through a transfer system 12 to an R register 14. These components are each adapted to receive a number of two-state signals which, when high, indicate the occurrence of the increment for which they are named or a negative value for such an increment. In the operation of the integrator symbolically shown in FIGURE 1, the value Y, i.e., the value of a dependent variable in a mathematical function, will be registered in the Y register 10. This value Y may be varied incrementally by either full increments indicated by the two-state signal $\Delta Y_1$ being high, or by half-increments indicated by a high value for the two-state signal $\Delta Y_{1/2}$. Such incremenets may be either positive or negative, as will be indicated respectively by a low or a high value for the signal $\Delta Y_s$.

The value in the Y register will be added to the R register 14 through the transfer system 12, in whole or part, each time the transfer system 12 receives in increment in the value of an independent variable X of a mathematical function. The increments in X may be either full or half-increments indicated by which of the signals $\Delta X_1$ or $\Delta X_{1/2}$ is at a high value. The sign of the increments $\Delta X$ is indicated by a two-state signal $\Delta X_s$. If the signal $\Delta X_s$ is high, a negative value is indicated for the increment, and conversely, if the signal $\Delta X_s$ is low, a positive value in indicated.

The operation of the system of FIGURE 1 is such that if the transfer system 12 receives the signal $\Delta X_{1/2}$ at a high value, indicating a half-increment in the independent variable, then only one half the contents of the Y register 10 will be added into the R register 14. Receipt of the signal $\Delta X_1$ at a high value by the transfer system 12 will cause the addition of the full contents of the Y register 10 into the R register 14. The fact that the increments in the quantities X and Y may be either positive or negative is also considered and the value added to the R register 14 is complemented if such a value is indicated to be negative. The process of effecting a subtraction by complementing and adding is well known in the prior art.

As the content of the R register 14 varies, it may reach certain predetermined values and generate either a positive or negative increment in the output quantity Z. Two such predetermined values are provided in the illustrative embodiment of this invention, which, when reached by the content of the R register, form an increment $\Delta Z$ in the output quantity. Of course, any reasonable number of predetermined values could be used to provide increments of as many magnitudes. Half-increments are produced when the lower predetermined value in the R register is reached unless this value is passed during an addition to such an extent that the higher predetermined value is reached, which indicates a full increment. The occurrence of a high value for the signal $\Delta Z_1$ indicates a full increment in the output quantity Z, whereas a high value for the signal $\Delta Z_{1/2}$ indicates a half-increment. The signs of these increments are indicated by the value of the signal $\Delta Z_s$ according to the adapted convention.

Figure 2:
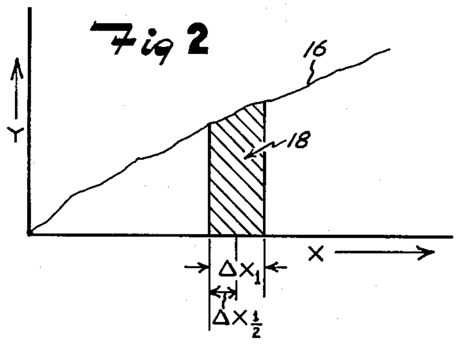
FIGURE 2 is a graphic representation of the operation of a digital integrator.

The functional operation of the digital integrator, summarily described with reference to FIGURE 1, is graphially illustrated in FIGURE 2. The FIGURE 2 shows a curve 16 plotting a mathematical function. The independent quantity X of the function is plotted as abscissa and the dependent quantity Y is plotted as ordinate. As the independent quantity X varies, discrete variations in the dependent quantity Y are registered in the Y register 10 by increments of two different magnitudes, $\Delta Y_{1/2}$ and $\Delta Y_1$. In the event that the transfer system receives an increment $\Delta X_1$, representative of a width as shown in FIGURE 2, the area 18, i.e., the full content of the Y register 10, will be added into the R register 14; however, if the increment $\Delta X_{1/2}$ is received representative of the width shown in FIGURE 2, only one half of the area 18 will be added into the R register 14. The areas repeatedly added to the content of the R register may cause output signals from the R register indicative of increments $\Delta Z_{1/2}$ or $\Delta Z_1$ representative of increments of area under the curve 16. The summation of the increments $\Delta Z_{1/2}$ and $\Delta Z_1$ thus results in a process of integration. By the provision of an output quantity $\Delta Z_{1/2}$, quantities which might otherwise remain in the R register 14 and be lost as round-off, are thus sensed from the R register 14 thereby reducing the round-off error.

Figure 3:
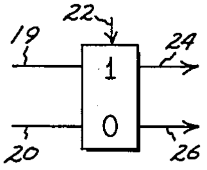
FIGURE 3 is a symbolic representation of a binary unit.

Prior to a discussion of the detailed structure of the described embodiment of a digital integrator, a brief discussion will be made of certain symbols utilized in the description. FIGURE 3 shows a symbol used for representing a flip-flop or binary unit. Functionally, the device represented symbolically in FIGURE 3 is adapted to receive input signals on either of two lines 19 or 20, and a clocking or timing signal on a line 22. The coincidence of an input signal with a clocking signal causes the binary to assume a state such that an output will be provided to indicate the line on which the last input signal was received. For example, if an input signal is received on the line 19 in coincidence with a clocking signal on the line 22, the binary will be set and a high value of a two-state signal will appear on the line 24 and continue to appear until the line 20 receives a signal in coincidence with the timing signal in the line 22 to reset the binary. A one-bit binary register is thus provided. If the output signal to the line 24 adjacent to a "1" digit is high, the register will be considered to contain a "one-digit" and said to be set. If the binary is in such a state that the output signal to the line 26 adjacent the "0" is high, then a "zero-digit" is registered, and the binary is said to be reset.

Bi-stable multivibrator circuits satisfactory for use as this binary unit are well known in the prior art, and one such circuit is shown and described beginning on page 16 of a book entitled "High-Speed Computing Devices" by Engineering Research Associates, published by McGraw-Hill Book Company, Inc. These binary circuits or multivibrators may operate solely under the control of information-representing or logic signals, or alternatively their operation may be additionally controlled by clock signals. A binary which employs clock signals requires the presence of a clock signal in addition to a logic signal in order to effect a change in state. A binary circuit that is timed to operate by clock signals is shown and described on page 96 of a book entitled "Automatic Digital Calculators" by Booth and Booth, published in 1953 by Butterworths Scientific Publications, London. Both timed or "clocked" binary circuits and untimed binary circuits are employed in the described embodiment of this invention. These circuits are distinguished by the presence or absence of a clock signal input.

Figure 4:
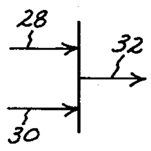
FIGURE 4 is a symbolic representation of an "or" gate unit.

Another unit utilized in the described embodiment of this invention is generally referred to as an "or" gate and is symbolically shown in FIGURE 4. The "or" gate has a number of input lines, e.g., lines 28 and 30. The appearance of a high signal on any of these input lines provides a high output signal on an output line 32; however, no intercoupling occurs between the separate input lines as 28 and 30. This unit is electrically important to prevent undesired coupling; however, in the described embodiment, the unit performs no logical functions. An electrical circuit capable of serving as this symbolically represented "or" gate is shown and described on page 32 of a book entitled "Arithmetic Operations in Digital Computers" by R. K. Richards, published by D. Van Nostrand Company.

Figure 5:
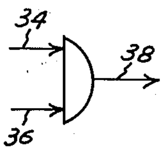
FIGURE 5 is a symbolic representation of an "and" gate unit.

A symbolic representation of another unit utilized in the description of the digital integrator is shown in FIGURE 5 and is termed an "and" gate or simply a gate. The "and" gate has a plurality of input lines 34 and 36, and a single output line 38. The operation of the "and" gate is such that all of the input lines 34 and 36 must receive a high signal before a high signal will appear at the output line 38. An electrical circuit capable of so operating is shown and described on page 32 of the above referenced book "Arithmetic Operations in Digital Computers."

Figure 6:
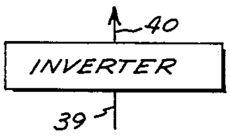
FIGURE 6 is a symbolic representation of an inverter unit.

A symbolic representation of another unit, termed an inverter, utilized in the disclosed system is shown by FIGURE 6. The inverter functions to provide a two-state signal inverted in form from that received. The inverter, as symbolically represented in FIGURE 6, has an input line 39 adapted to receive a two-state signal and an output line 40 at which an inverted two-state signal will appear. An electrical circuit capable of performing the function of this unit is shown on page 36 of the above referenced book "Arithmetic Operations in Digital Computers."

Another element used in the disclosed embodiment is a serial binary adder. A binary adder circuit is shown in FIGURE 7, utilizing symbols previously explained.

Binary addition is carried out in a manner somewhat similar to decimal addition; however, for a detailed explanation of binary addition, reference is made to an araticle entitled "Arithmetic Processes for Digital Computers" by J. H. Felker, which appeared in Electronics Magazine, March 1953, beginning on page 150.

Figure 7:
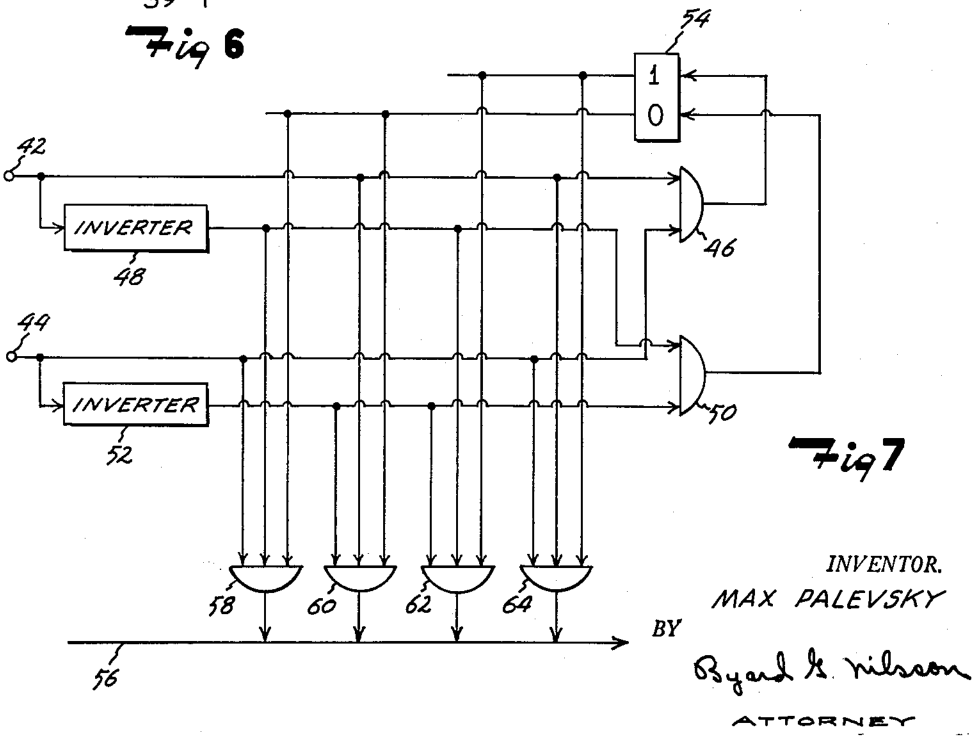
FIGURE 7 is a block diagrammatic representation of a binary adder.

The binary adder shown in FIGURE 7 is of a serial type wherein pulse trains, representative of binary numbers, are combined to derive pulse trains representative of sums. The presence of a pulse at a particular time in a pulse train indicates a one-digit and the absence of such a pulse indicates a zero-digit. The two pulse trains, representing binary numbers which are to be added, are applied individually to the terminals 42 and 44. The terminal 42 is connected directly to a gate 46 and through an inverter 48 to a gate 50. The terminal 44 is connected directly to the gate 46 and through an inverter 52 to the gate 50. The output lines from the gate circuits 46 and 50 are connected to control the state of the binary 54. The binary 54 is referred to as the carry binary and serves to register digits which are to be carried over from one digit position to the next during a binary addition.

An output line 56 from the binary adder is connected to receive signals from a group of gate circuits 58, 60, 62, and 64. The qualification of any of these gate circuits, causing a high signal to be passed, will form a pulse in the output line 56, thereby indicating a one-digit for a particular digit position. In the event that none of the gate circuits 58, 60, 62, or 64 pass a high signal during a pulse position, then a zero-digit will be indicated.

To briefly consider an exemplary operation of the binary adder of FIGURE 7, if two pulses representing one-digits occur during a first digit position at the terminals 42 and 44, the gate circuit 46 is qualified and the carry binary 53 is set to indicate a one-digit is registered. During the second digit position, the state of the binary 54 is sensed by the gates 62 and 64 to effect a carry of the one-digit in this digit position. If now, for example, two zero-digits are received at the terminals 42 and 44 during the second digit position, the gate circuit 62 is qualified, and a pulse is passed to the output line 56, representative of the carry digit. The carry binary 54 remains in a set state registering a one digit until the gate circuit 50 is qualified to pass a signal which resets the binary 54.

The operation of serial binary circuits for additively combining binary numbers is well known in the prior art and several such adders are shown and described beginning on page 81 of the above reference book "Arithmetic Operations in Digital Computers." The operation of the binary adder of FIGURE 7 is not claimed to be unique or novel in any features; however, the adder is shown in detail to provide an understanding of the operation of the carry binary 54.

Figure 8:
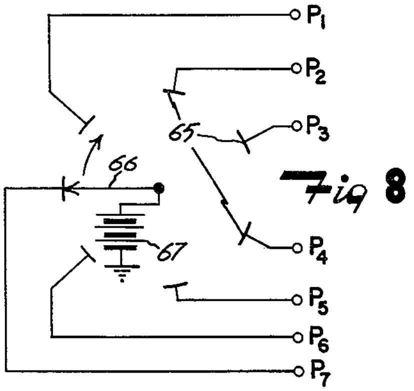
FIGURE 8 is a symbolic representation of a timing pulse generator.

The digital integrator, herein described, requires a number of timing pulses. Such timing pulses serve to clock the changes within the integrator which represent information transfers. A signal generator for generating the necessary timing pulses $P_1$—$P_7$ for a single cycle of integration is symbolically shown in FIGURE 8. A brush 66, connected to be energized by a battery 67, is revolved in a clockwise fashion sequentially contacting segments 65 to provide pulses $P_1$—$P_7$ at similarly identified output terminals $P_1$—$P_7$.

Figure 9:
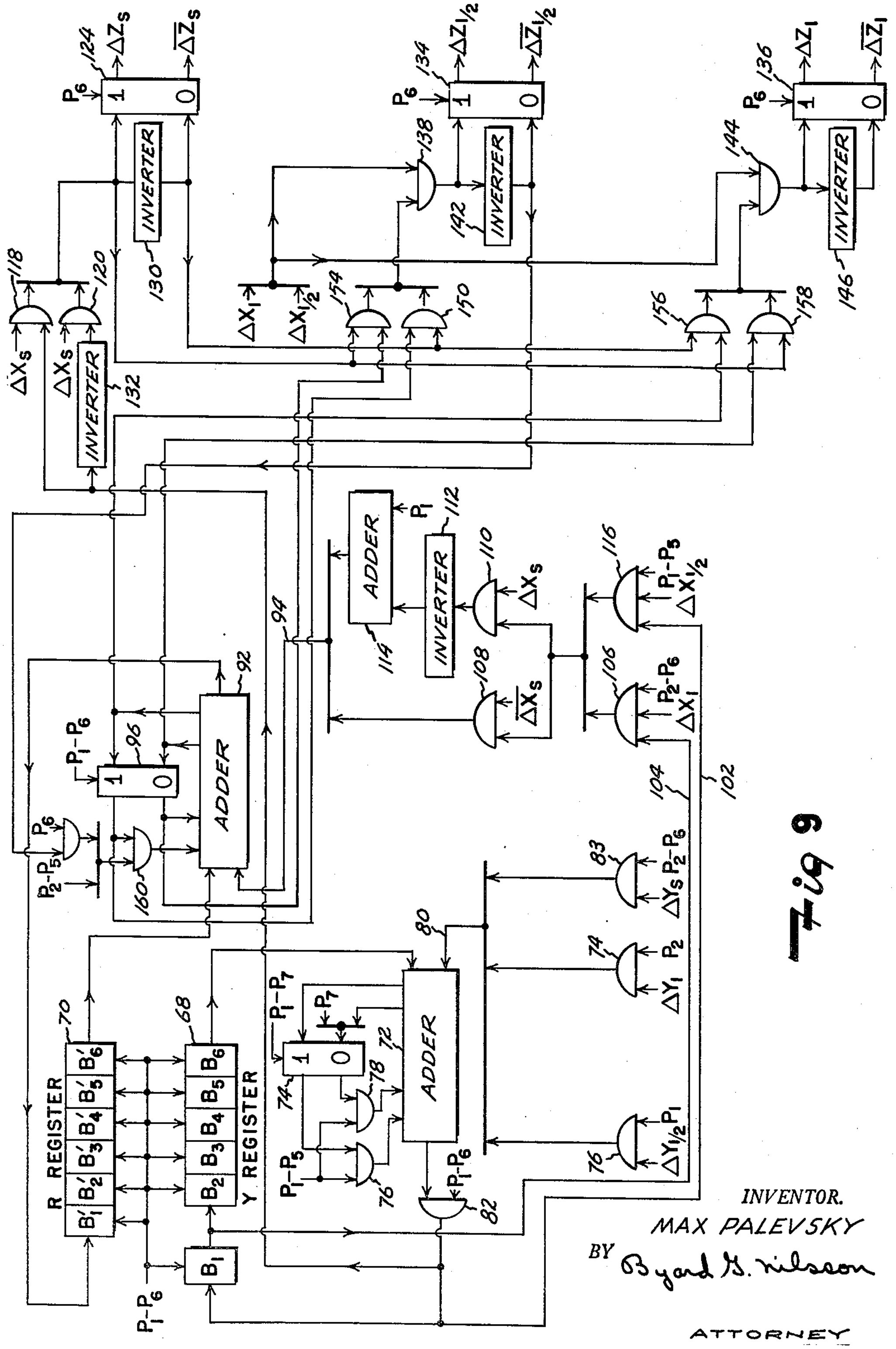
FIGURE 9 is a block diagrammatic representation of a digital integrator constructed in accordance with the principles of this invention.

Reference will now be had to FIGURE 9 which shows an embodiment of the digital integrator utilizing symbols previously explained. There is shown in FIGURE 9 a Y register 68 comprising binaries $B_1$—$B_6$ and an R register 70 comprising binaries $B_1'$—$B_6'$. These registers may be formed of various binary units including bi-stable multivibrators, magnetic cores, single delay lines, or single magnetic drum tracks. The operation of each of the registers 68 and 70 is such that electrical pulses, representing information, placed in the register at one end will be stepped through the register by timing pulses $P_1$—$P_6$ to emerge from the register after an interval coinciding to the occurrence of six such timing pulses.

The output from the Y register 68, representing the value Y, is applied to one of the input terminals of a binary adder 72. The binary adder 72 has a carry binary 72*a* (shown external to the adder) having outputs returned to the adder 72 through gate circuits 76 and 78. The other input to the binary adder 72, through an input line 80, constitutes increments in the value Y, $\Delta Y$.

The output from the binary adder 72 is applied to a gate circuit 82 which receives pulses $P_1$—$P_6$, and, therefore, passes the output from the binary adder 72 during intervals of pulses $P_1$—$P_6$. The output of the gate circuit 82 is connected back to the input of the Y register 68 at the binary $B_1$. It may therefore be seen that the contents of the Y register will repeatedly circulate through the adder 72 to be combined with increments in Y represented by pulse trains appearing upon the line 80.

Figure 10:
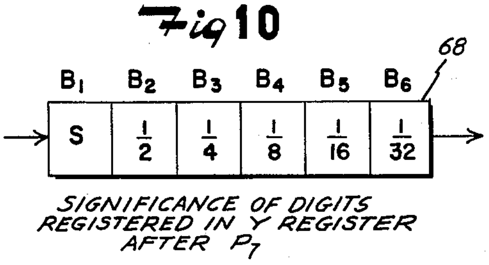
FIGURE 10 is a chart illustrating the contents of one of the registers of FIGURE 9.

Various significance may be attached to the individual digits registered in the Y register; however, for illustrative purposes, the significance attached to these digit positions will be as shown in FIGURE 10. FIGURE 10 shows the Y register 68, including binaries $B_1$—$B_6$, and the significance of the digits registered by each of these binaries after the occurrence of the pulse $P_6$. The binary $B_1$ registers the sign digit of the value contained in the Y register 68, binary $B_2$ registers the binary equivalent of the fraction ½, binary $B_3$ registers the binary equivalent of the fraction ¼, and so on as shown. The sign of the number contained in the Y register 68 is indicated to be negative when the sign digit is one, i.e. a pulse, and negative when the sign digit is zero, i.e. no pulse. It may also be noted at this time that if the content of the Y register 68 is negative, it is held in a complemented form.

Figure 11:
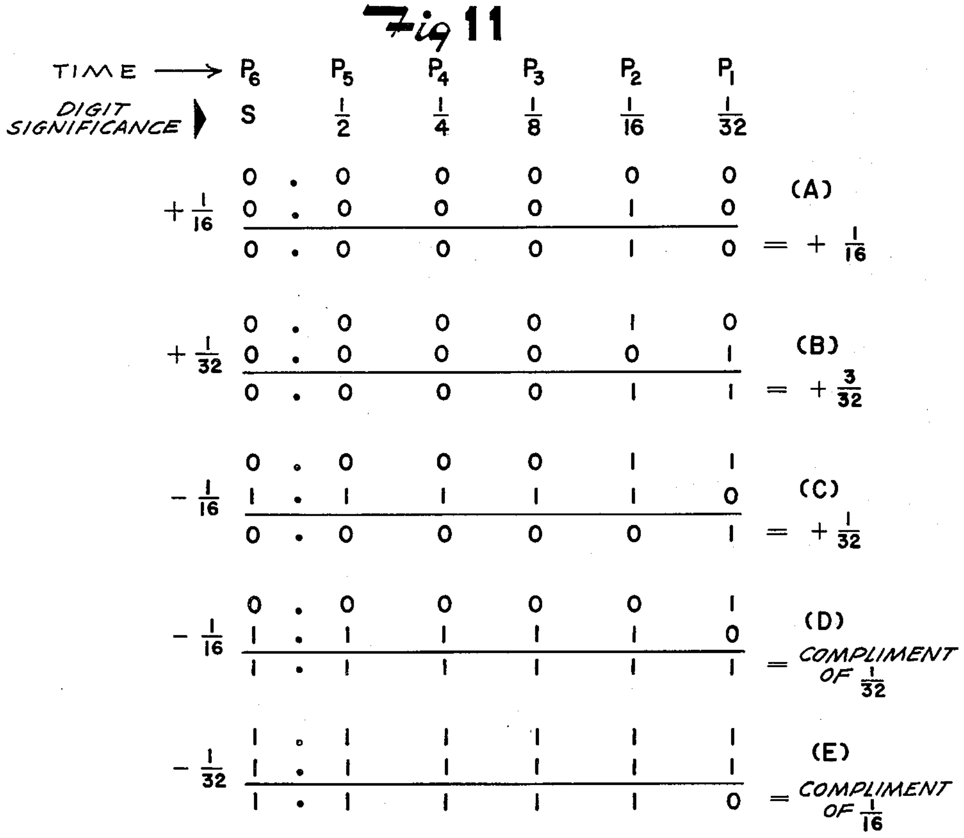
FIGURE 11 is a chart illustrating the operation of one portion of the integrator of FIGURE 9.

Reference will now be had to FIGURE 11 which shows several examples of the addition of different increments in the value Y to the content of the Y register 68. At the top of the chart of FIGURE 11 are shown time intervals coinciding to the pulse positions $P_1$—$P_6$. The interval of pulse $P_7$ is not shown because this interval is provided only to allow the integrator to register the result of most recently performed integration in its output circuits and become quiescent preparatory to another cycle of integration. Therefore, no addition of $\Delta Y$ to Y occurs during the interval of the pulse $P_7$, and the Y register 68 is quiescent.

Immediately under the time-indicating pulses $P_1$—$P_6$ in FIGURE 11 are shown decimal fractions equivalent to the significance of the binary digits which appear at the adder 72 at the time of the pulses $P_1$—$P_6$. Assume initially that the content of the Y register is zero, in which event zero digits, i.e., no pulses, will be circulating in the Y register 68. The example of FIGURE 11A will now be considered to illustrate the addition to Y of an increment $\Delta Y_1$ which, in the number system chosen for illustration, will always be equivalent to a fraction $\frac{1}{16}$.

Upon the occurrence of a high value of the signal $\Delta Y_1$ during an integration cycle, an increment of $\Delta Y_1$ will be indicated and the gate 74 will be qualified during the time of pulse $P_2$ to pass a digit to the binary adder 72 via the line 80. This digit-indicating pulse will then be registered in the binary $B_1$ such as to have a significance of $\frac{1}{16}$. No other pulses will be passed to the line 80 during the following pulses $P_3$—$P_6$.

Assume now, for example, that a half-increment $\Delta Y_{1/2}$ occurs to add the binary equivalent of a decimal fraction $+\frac{1}{32}$ to the content of the Y register 68. The occurrence of a high value of the signal $\Delta Y_{1/2}$ during an integration cycle indicates an increment $\Delta Y_{1/2}$. The high signal $\Delta Y_{1/2}$ qualifies a gate circuit 76 during the interval of pulse $P_1$ to apply a one digit-indicating pulse to the line 80 to be added in the adder 72 during the interval of $P_1$. This addition is shown in the example of FIGURE 11B and results in a binary value equivalent to a decimal fraction $+\frac{1}{32}$, which value is registered in the Y register 68.

The above examples assume the occurrence of positive values for the increments $\Delta Y$; however, these increments may also be negative. Assume, for example, that a negative increment $\Delta Y_1$, representative of the fraction $-\frac{1}{16}$, is to be added to the content of the Y register 68. In such an instance, both the signals $\Delta Y_1$ and $\Delta Y_s$ are high. The gate circuit 74 is therefore qualified during the pulse $P_2$ and a pulse is passed to the line 80 during this interval. The high signal $\Delta Y_s$ qualifies the gate circuit 83 during the times pulses $P_2$—$P_6$, and pulses are passed to the line 80 during such pulses. It may therefore be seen that during the addition of a binary equivalent of the fraction $-\frac{1}{16}$, the complemented value of this fraction, i.e. 11110, will be passed to line 80 and thence to the adder 72. The addition, which then occurs in the adder 72, results in a value equivalent to the decimal fraction $+\frac{1}{32}$, as shown in FIGURE 11C.

The occurrence of another increment $\Delta Y_1$, which is negative in value, will again cause the gate circuits 74 and 83 to be similarly qualified, again adding the complement of the binary equivalent of the decimal fraction $-\frac{1}{16}$ into the content of the Y register. This binary addition is shown in the example of FIGURE 11D, and results in a value circulating in the Y register which is the complement of the binary equivalent of the decimal fraction $-\frac{1}{32}$.

The occurrence of a half-increment $\Delta Y_{1/2}$ of a negative nature forms the signals $\Delta Y_{1/2}$ and $\Delta Y_s$ at a high value. Therefore, the gate circuit 76 is qualified during the interval of the pulse $P_1$ and passes a pulse to the line 80 at a time to have a significance of decimal $\frac{1}{32}$. The gate circuit 83 is then qualified during the intervals of pulses $P_2$—$P_6$ to pass pulses to the line 80. It may therefore be seen that upon an occurrence of a negative half-increment $\Delta Y_{1/2}$, one-digit signals will be passed to the line 80 during all digit positions, resulting in the addition of the complement of the binary equivalent of the fraction $\frac{1}{32}$ to the content of the Y register 68. This addition is shown in FIGURE 11E to result in the equivalent of the fraction $-\frac{1}{16}$. Thus, positive and negative increments of two magnitudes in the value Y may be added to the content of the Y register to maintain a varying value of Y available in a serial fashion from the Y register 68.

It is to be noted that the carry binary 72*a*, associated with the adder 72, has its output blocked during pulses $P_6$ and $P_7$ by the gate circuits 76 and 78. This block prevents carries from the sign digit being placed in the digits position having a significance of the fraction $\frac{1}{32}$.

Consider now the R register 70 and the manner in which signals representing binary numerical information circulate therein. The output from the R register 70 is applied to a serial binary adder 92 which is also connected to receive the value of Y on a line 94 in a manner to be later described. The output from the binary adder 92 is returned to the R register 70 at the binary $B_1'$. The adder 92 has a carry binary 96 (shown external to the adder) having connections in addition to the usual, which will be considered later.

Figures 12, 13, 14:
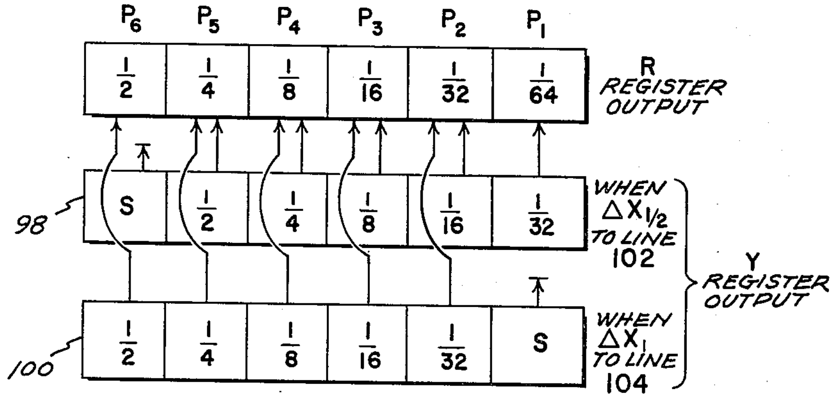
FIGURE 12 is a chart illustrating the operation of another portion of the integrator of FIGURE 9.
FIGURE 13 is a chart illustrating the operation of another portion of the integrator of FIGURE 9.
FIGURE 14 is a chart illustrating the operation of another portion of the integrator of FIGURE 9.

During the time when the value of Y is not being added to the value of R, the content of the R register 70 circulates via the adder 92 and is thus preserved. The sequence in which two-state signals representing binary digits in the R register 70 circulate is shown in FIGURE 12. FIGURE 12 shows time intervals indicated by pulses $P_1$—$P_6$, the pulse $P_7$ is not applied to the R register 70, therefore, the R register is quiescent during that pulse. Under each of the time-indicating pulses $P_1$—$P_7$, as designated, are boxes containing a decimal fraction equivalent to the significance of the binary numerical value received at the adder 92 from the R register 70 during the pulse times. For example, during the time of the pulse $P_1$, a binary signal will be received at the adder 92 from the R register 70, having a significance equivalent to the fraction $\frac{1}{64}$. Similarly, during the interval of the pulse $P_2$, a binary signal having a significance equivalent to $\frac{1}{32}$ will be applied to the adder 92, and so on as shown in FIGURE 12.

The numerical value circulating in the R register has one more numeric digit position than the value circulating in the Y register 68. This additional digit position, i.e., binary signal time space, is present because the sign of a numerical value is not carried in the R register 70. The manner of handling the sign of the R value will be discussed later; however, in view of the increased numerical capacity of the R register over the Y register, an additional digit position equivalent to the fraction $\frac{1}{64}$ is provided. A need for this digit position arises because one half the content of the Y register 68 may be added to the R register 70, and, as the least significant digit in the Y register 68 is equivalent to $\frac{1}{32}$, a need exists for a digit position in the R register 70 equivalent to $\frac{1}{64}$.

In the circulation of the value of Y through the Y register 68 and the associated binary adder 72, provision is made to take the value of Y from this loop either from the gate circuit 82 or from the binary $B_1$. A time lag of one pulse interval separates these two outputs. Therefore, signals indicative of a particular digit, which leave the gate 82, will appear at the output from the binary $B_1$ delayed by one digit position, i.e., timing pulse duration. The outputs from the gate 82 and the binary $B_1$ are illustrated respectively by the rows 98 and 100 in FIGURE 12. The row 98 indicates the output sequence arriving at the adder 92 directly from the adder 72 via the gate 82 and the line 102, whereas the row 100 indicates the sequence of the digits arriving at the adder 92 from the binary $B_1$ via a line 104. To illustrate the displacement between the two outputs, consider the outputs which occur prior to and during the first portion of the pulse $P_2$. At such a time the output to the line 102, as shown by the row 98, is equivalent to the decimal fraction $\frac{1}{16}$; however, the output to line 104, as shown in row 100, is equivalent to the decimal fraction $\frac{1}{32}$. Consideration of FIGURE 12 will further indicate that if the outputs shown in row 98 are added to the content of the R register, the value of Y will be divided by two. That is, for example, the digit having a significance of $\frac{1}{32}$ will be time-displaced in line 102 to be shifted in significance to $\frac{1}{64}$, resulting in a division by two. The more significant digits are similarly treated and, in this manner, one half the content of the Y register is added to the content of the R register. If, however, the output to the line 104, as shown by the row 100, is added to the output from the R register, the digits of the value Y are added in full significance. For example, during the time of the pulse $P_2$, the digit in the value of Y, having a significance equal to $\frac{1}{32}$, will be added to a digit from the R register 70, also having a significance of $\frac{1}{32}$.

Consideration will now be directed to the manner in which the value of Y, i.e., the dependent variable, or one half thereof is added to the content of the R register upon the occurrence of a discrete increment in the value of X, i.e., the independent variable.

Upon the occurrence of a full increment in $\Delta X$, the signal $\Delta X_1$ will be at a high value during a cycle of integration, thereby resulting in the qualification of a gate circuit 106 during pulses $P_2$—$P_6$. The gate 106 is connected to receive the output from the Y register 68 via the line 104. Consideration of the chart of FIGURE 12 will indicate that during the pulses $P_2$—$P_6$ the value shown in row 100, i.e., the output to line 104, will be added to the output from the R register 70 by the adder 92. It is to be noted, however, that the gate circuit 106 is blocked during the intervals of the pulses $P_1$ and $P_7$. During the pulse $P_1$, the sign digit from the Y register 68 is received and this digit is not added to the content of the R register. During the interval of $P_7$, no adding operations take place in the integrator, as this interval is provided for the integrator to become quiescent prior to performing another integrating cycle.

After passing through the gate circuit 106, the digits appearing on the line 104, as shown in the row 100 of FIGURE 12, are applied to gate circuits 108 and 110. In the event that the increment in $\Delta X$ is positive, the signal $\Delta K_s$ will be at a low value and the negation thereof, the signal $\overline{\Delta X_s}$, will be at a high value. If the signal $\overline{\Delta X_s}$ is at a high value, indicating a positive increment in $\Delta X$, the gate circuit 108 will be qualified to allow the signals indicative of the full value of Y to be applied directly to the adder 92 to be added to the content of the R register 70. If, however, the signal $\Delta X_s$ is high, indicating a negative increment in the independent variable X, then the gate circuit 110 is qualified. Qualification of the gate circuit 110 applies the pulses representative of the dependent variable Y to an inverter circuit 112 wherein pulses are formed into no pulses and no pulses are formed into pulses. The output of the inverter circuit 112 is applied to an adder circuit 114 which receives another input in the form of the pulse $P_1$. The inverter circuit 112 and the adder circuit 114 collectively function to complement the value of the dependent variable Y prior to applying this value to the adder 92. The principles of complementation to effect a subtraction by an addition process are well understood and are explained in the prior art including the above referenced Electronics Magazine article. One manner of effecting complementation is to individually invert each of the digits of a binary number, i.e., transform one digits into zero digits and vice versa, then to add a one digit to the least significant digit of the number. This is the method used in the above described circuitry. The complemented value of the dependent variable Y is then added to the value in the R register 70 by the adder 92 to result in a number which is the difference between the uncomplemented value of Y and the value in the R register. Thus, upon the occurrence of a negative increment in the independent variable X, the positive content of the Y register is effectively subtracted from the content of the R register.

In the event that the value in the Y register is negative, and therefor in complemented form, and the increment in X is also negative, then the value of Y will be complemented just as previously described; and double complementation resulting in an uncomplemented value. Thus, in effect, with the occurrence of a full increment in the independent variable X, the value registered in the Y register 68 is, in effect, added to the content of the R register 70 if both values are either positive or negative and effectively subtracted from the content of the R register 70 if one of these values is positive and the other is negative.

In the event that the increment in the independent variable X is a half-increment, then only one half the content of the Y register 68 is added to the content of the R register 70, either in complemented or uncomplemented form depending upon the signs of the quantities Y and ΔX. Upon the occurrence of such an increment, the signal $\Delta X_{1/2}$ will be at a high value and qualify a gate circuit 116 during the intervals of pulses $P_1$—$P_5$. Consideration of the row 98 of FIGURE 12 will indicate that it is only during the intervals of pulses $P_1$—$P_5$ that the content of the Y register 68 from line 102 is to be added to the content of the R register 70. With the qualification of the gate circuit 116, during these intervals, the digits of Y will appear in the form of electrical pulses at the output from the gate circuit 116 time-shifted such as to be divided by two. These pulses from the gate circuit 116 are then passed either through the gate circuit 108 or the gate circuit 110 to be either uncomplemented or complemented, depending upon whether the increment in the independent variable X is positive or negative, as previously explained, relative to full increments.

The additions of one half the value of Y to the contents of the R register 70 upon the occurrence of a half-increment in X, are thus either positive or negative, that is, complemented or uncomplemented, depending upon the signs of the quantities Y and ΔX. If the signs of both quantities are negative, a positive (uncomplemented) quantity should be added, and the Y quantity will therefore not be complemented. If the signs of these quantities are different, then a negative (complemented) quantity is passed to the adder 92 in the same manner as explained with reference to full increments, either because of the action of the inverter 112 and the adder 114 or because the content of the Y register 68 was negative and already complemented.

Repeated additions of positive or negative values of Y to the R register 70 may periodically cause the value in this register to reach predetermined values, causing signals representing increments in the output quantity Z to be formed. The increments ΔZ are effectively the differential combination of Y and ΔX, i.e. $\Delta Z = Y\Delta X$, and has been fully explained in the prior art including the articles cited above. The production of an increment ΔZ must be accounted for in the R quantity, therefore, the R quantity is reduced by the increment in ΔZ which is formed. That is, in methematical terms the function performed is:

$$R_n = R_o + Y\Delta X - \Delta Z$$

where:

$R_n$ is the new value of R (after an integrating cycle)
$R_o$ is the old value of R (prior to an integrating cycle)
$Y\Delta X$ is the differential combination, and
ΔZ is the increment in the output quantity produced.

The illustrative embodiment of this invention has a quinary output; that is, the increments in the output quantity Z may take on five exclusive values: full increments $\Delta Z_1$ of either sign, half-increments $\Delta Z_{1/2}$ of either sign, or zero. Of course, additional magnitudes of value for the output quantity could be provided within the concepts of this invention. In this regard, it is to be understood that the output quantity ΔZ may be applied to other integrators, or the integrator forming such a quantity, according to particular programs for the solution of mathematical problems as taught in the prior art. Therefore, the signals indicating increments ΔZ must be compatible with the input signals indicating increments in the dependent quantity Y and the independent quantity X. It is to be noted that these increments are consistently represented by similar electrical signals in each of the three quantities.

A negative quantity ΔZ results when the content of the R register 70 reaches a predetermined complemented value, that is, a predetermined complemented value indicating a predetermined negative value. However, in the event that the content of the R register reaches a predetermined uncomplemented value, then a positive increment will result. The sign of the content of the R register 70 is not registered; therefore, the manner of detecting whether increments in the output quantity Z are positive or negative is to observe the R register each time an increment in the independent quantity X occurs. If the dependent quantity added to the content of the R register 70 is uncomplemented and the R register reaches a value equivalent to ½, then a positive half-increment in the output quantity Z is indicated. Should the addition of an uncomplemented dependent quantity Y cause the capacity of the R register 70 to be exceeded (in a positive direction), then a value equivalent to decimal 1 is indicated, and a positive full increment in the output quantity occurs. In the event the quantity Y added to the R register 70 is complemented, and the R register 70 exceeds its capacity, then a negative full increment in the output quantity Z will occur. The addition of a complemented quantity to the R register 70, which causes the value in the register to reach a value equivalent to —½, results in a negative half-increment in the output quantity Z. It is therefore necessary to observe the R register 70 during periods when output quantities can possibly result, and to observe whether the last value of the dependent quantity Y yielded to the R register was uncomplemented or complemented. These observations enable the determination of the magnitude, sign, and existence of an increment in the output quantity Z.

Numerical examples are set out in FIGURES 13 and 14 which illustrate the above described principles. FIGURE 13 shows a numerical example wherein uncomplemented values of Y are added to the content of the R register until a predetermined value is reached indicating an increment in the value Z. At the top of FIGURE 13, there are shown fractions which indicates the significance of the binary numbers set out in the columns below. The first binary number 011101 under these fractions is assumed to be the value R circulating in the R register 70 and is equivalent to the fraction $^{29}/_{64}$. Assuming that a value of Y of $+^{1}/_{32}$ is added to this value, a binary value 011111 will result equivalent to the decimal fraction $^{31}/_{64}$. The fact that the most significant digit in this binary number is a zero, coupled with the fact that an uncomplemented quantity was added, indicates that no overflow resulted. Consider now another addition of a value of Y equivalent to $^{1}/_{32}$. The result of such an addition will be the binary number 100001 equivalent to $^{33}/_{64}$. This addition results in a one digit in the most-significant digit position, having significance of ½. This fact and the fact that the Y value added to the content of the R register was uncomplemented indicates that an output of half-increment size will be formed.

FIGURE 14 shows a similar example, however, in this FIGURE complemented values of Y are added to the content of the R register 70 until an output quantity results. Assume that the binary 100011, shown in the row below the fractions (indicating the digits significance), is circulating in the R register 70. This value is equivalent to the decimal fraction $-^{29}/_{64}$ since it is a complemented form of binary 29/64. Assume now the addition of a value Y of 111110 equivalent to the fraction $-^{1}/_{32}$. The result of this addition is the binary number 100001 equivalent to the decimal $-^{31}/_{64}$. The most-significant digit in this number having a significance of ½ is now a one digit and, therefore, does not indicate an output quantity since a complemented quantity was added to the R register 70. Assume now the addition of another value of Y of 111110 to the R register equivalent to the decimal fraction $-^{1}/_{32}$. The result of this addition will be 011111 equivalent to the fraction $-^{33}/_{64}$. In this sum a zero digit has been generated in the most-significant digit position having a significance of the decimal fraction ½ and a complemented quantity Y was added to the R register. Therefore, a negative half-increment in the output quantity is indicated.

It may thus be seen that upon the occurrence of a one digit in the most-significant digit position of the R value, when an uncomplemented quantity has been added into the R register, results in a positive increment $\Delta Z_{1/2}$. Further, in the event that a complemented quantity Y is added to the contents of the R register and results in generating a zero digit in the digit position having a significance of ½, then an increment $-\Delta_{1/2}$ results.

These numerical examples only illustrate the manner in which half-increments in ΔZ are formed; however, full increments in ΔZ, as represented by the signal $\Delta Z_1$, are formed in a similar fashion when the sum of the R and Y values exceed a value of ½ during an integrating cycle to such an extent as to reach a value of 1, and cause the R register 70 to overflow. That is, the increments $\Delta Z_{1/2}$ are sensed by observing the most-significant digit position of the R register 70, and the increments $\Delta Z_1$ are sensed by observing carry digits out of this most-significant digit position.

Consideration will now be made of the manner of generating the electrical signals $\Delta Z_s$ and $\overline{\Delta Z_s}$ which represent the sign of an increment in the output quantity Z. In the event that $\Delta Z_s$ is a high value, $\overline{\Delta Z_s}$ will be a low value, and the increment in the output quantity Z will be indicated to be negative. If, however, $\Delta Z_s$ is a low value, $\overline{\Delta Z_s}$ will be high, and the increment ΔZ will be indicated to be positive. In order to determine whether the increment in Z is positive or negative, it is necessary to know the sign of the increment ΔX and the sign of the quantity Y added to the R register. If both these quantities Y and ΔX are either positive or negative, then an output increment ΔZ is known to be positive because the product of quantities of like signs must be positive, and if the value R reaches a predetermined value to form an increment ΔZ, the value R will be of the same sign as the last-added value Y. If, however, one of the quantities ΔX or Y is negative and the other is positive, the increment in the output quantity ΔZ is negative because the product of quantities of different signs is negative.

Gate circuits 118 and 120 serve to ascertain the signs of the increments ΔX and the dependent quantity Y. The output from the gate circuits 118 and 120 is applied to a binary 124 which receives a clocking pulse only during pulse $P_6$, and may therefore change state only during this interval. The output from the gate circuits 118 and 120 is also applied to the binary 124 through an inverter 130. The passage of a pulse by one of the gate circuits 118 or 120 during the pulse $P_6$ serves to set the binary 124 to provide the signal $\Delta Z_s$ high and the signal $\overline{\Delta Z_s}$ low, indicating a negative increment in the output quantity Z. Conversely, if no pulse is passed by either of the gates 118 or 120 during the pulse $P_6$, a high signal will be applied to the binary 124 from the inverter 130 which resets the binary 124, causing the signals $\Delta Z_s$ to be low, and the signal $\overline{\Delta Z_s}$ to be high, thus indicating a positive increment.

The gate circuit 118 is qualified at a time when the increment in the independent quantity ΔX is positive and the value of Y is negative. The sign digit of the value of Y is received by the gate circuit 118 during the interval of the pulse $P_6$ directly from the gate circuit 82. If the sign digit is represented by a pulse, the value of Y will be indicated to be negative and the gate circuit 118 will be qualified in part. Full qualification of the gate circuit 118 will then result if the signal $\overline{\Delta X_s}$ is high, indicating the increment in the independent quantity X is positive. Qualification of the gate circuit 118 thus occurs during the interval of the pulse $P_6$ if the increment in the independent quantity X is negative and the dependent quantity Y is positive. Such qualification indicates that the value of Y added to the R register 70 was negative, and, therefore, that any output increments ΔZ from the R register 70 occurring during this interval are negative. Qualification of the gate circuit 118 during the interval of the pulse $P_6$ will cause the binary 124 to be set and indicate a negative output quantity.

Alternatively, the gate circuit 120 may be qualified when the output quantity is negative; however, qualification of the gate circuit 120 occurs when the increment ΔX in the independent quantity is negative and the value of the dependent quantity Y is positive. The sign digit of the dependent quantity Y is applied to the gate circuit 120 through an inverter 132 from the gate circuit 82 during the interval of the pulse $P_6$. If the quantity Y is positive, no pulse will be received at the inverter circuit 132 during the interval of $P_6$, therefore, the inverter circuit 132 will provide a high output to the gate circuit 120. If the signal $\Delta X_s$ is high, the quantity will be indicated negative and the gate circuit 120 will be qualified during the interval of the pulse $P_6$. Qualification of the gate circuit 120 during the interval $P_6$ thus indicates the value of Y added to the R register was complemented, therefore, any output increment ΔZ must be negative and the binary 124 is set to indicate a negative increment ΔZ.

During intervals when the output quantity ΔZ is positive, neither the gate circuits 118 nor 120 will be qualified because the values of ΔX and Y will be of the same sign indicating an uncomplemented value was added to the R register 70, and, therefore, that any output increments which occur are positive. As neither of the gates 118 or 120 are qualified, the input to the inverter circuit 130 is low and the output from the inverter circuit 130 is high. The high output from the inverter circuit 130 resets the binary 124 during the pulse $P_6$, causing the signal $\overline{\Delta Z_s}$ to be high indicating a positive increment in the output quantity ΔZ. It is to be noted that the application of the sign-indicating signals $\Delta Z_s$ and $\overline{\Delta Z_s}$ to another integrator will probably be conditioned upon the occurrence of an output increment by a gate located in the interconnecting system.

Consider now the manner of formation of the signals $\Delta Z_{1/2}$ and $\Delta Z_1$ and their negations $\overline{\Delta Z_{1/2}}$ and $\overline{\Delta Z_1}$ which indicate the presence and magnitude of increments $\Delta Z$ in the output quantity Z. These signals are formed by binaries 134 and 136, respectively. The qualification of a gate circuit 138 during pulse $P_6$ sets the binary 134 to form the signal $\Delta Z_{1/2}$ high and indicate the occurrence of a half-increment. The binary 134 is reset during the interval of the pulse $P_6$ if a low output appears from the gate circuit 138 to be applied to an inverter 142. The binary 136 is set during the pulse $P_6$ upon the qualification of a gate circuit 144 to form the signal $\Delta Z_1$ high and reset during the pulse $P_6$ when the gate circuit 144 is not qualified.

An output increment $\Delta Z_{1/2}$ will be indicated when a digit equivalent to decimal ½ is reached in the value R and the formation of the signal $\Delta Z_{1/2}$ will now be considered. To ascertain the occurrence of an increment $\Delta Z_{1/2}$, the value circulating in the R register and the sign of this value must be detected. As the content of the R register does not carry a sign, but is complemented if negative, detection of the value in the R register reaching the equivalent of ½, must be made by considering both the value R and whether the quantity Y last added to the content of the R register was uncomplemented or complemented. If a complemented value is added to the content of the R register, causing the value in this register to reach the equivalent of −½, then an increment $\Delta Z_{1/2}$ is produced. Similarly, if an uncomplemented value of Y added to the content of the R register causes the resulting value of R to reach the equivalent of +½, an output $\Delta Z_{1/2}$ is again produced. A signal which indicates whether the value of Y last added to the content of the R register was complemented or uncomplemented is developed by the gate circuits 118 and 120 as previously described. If the output from either of the gate circuits 118 or 120 is high during the pulse $P_6$, a complemented value of Y was last added to the content of the R register 70. Conversely, if the output from the inverter 130 is high during the pulse $P_6$, an uncomplemented value of Y has been added. It is to be noted, however, that this signal assumes the existence of an increment in X indicating the addition of some quantity Y to the value in the R register.

As explained with reference to FIGURE 13, if the value Y last added to the value in the R register was uncomplemented, then an increment $\Delta Z_{1/2}$ will be indicated if a one digit appears in the binary 96 during the interval of pulse $P_6$ to indicate a value equivalent to −½ has been reached. This condition is detected by the gate 150 which is connected to receive the signal from the inverter 130 and a signal from the one side of the carry binary 96. The signal from the inverter 130 is high if the last added value of Y was uncomplemented, and the occurrence of a one digit in the most-significant digit position of the R value will cause the carry binary 96 to be set during the interval of the pulse $P_6$. Thus, the gate circuit 150 will be qualified. The output from the gate 150 is further qualified by the gate 138 which assures that an increment in the quantity X occurred during the integrating cycle. That is, unless an increment in X occurred, there was no value for $Y\Delta X$ and thus no output increment $\Delta Z$ could occur. Qualification of the gate 138 during the pulse $P_6$ sets the binary 134 to indicate an output increment $\Delta Z_{1/2}$.

If the value Y added to the content of the R register 70 during the last integration cycle was complemented, then an increment $-\Delta Z_{1/2}$ will be produced if the resulting sum exceeded the equivalent of −½. This condition was illustrated in FIGURE 14, and is detected by the gate circuit 154. The signal received by the gate circuit 154 from the gates 118 and 120 indicates (when high) that the value of Y added during the last cycle of integration was complemented. The connection from the zero side of the binary 96 to the gate 154 indicates (when high) that a zero digit is present in the digit position having a significance of ½, that is, the sum of the content of the R register and the value of Y has reached a value equivalent to −½. The qualification of the gate circuit 154 thus occurs when a complemented value of Y was last added to the R value, and that this addition resulted in a complemented value of R which reaches the equivalent of −½. The output of the gate 154 is qualified by the gate 138 just as the output from the gate 150. The gate circuit 138 thus ascertains the fact that some value of Y was added the value of R during the last cycle of integration. The gate circuit 138 is qualified and allows the signals from the gates 150 and 154 to pass if either of the signals $\Delta X_1$ or $\Delta X_{1/2}$ are high. If either of the signals $\Delta X_1$ or $\Delta X_{1/2}$ are high, an addition of Y has occurred during the last cycle of integration and the gate 138 will allow the binary 134 to be set indicating an increment $\Delta Z_{1/2}$ by forming the signal $\Delta Z_{1/2}$ at a high value.

It is to be noted that if an increment $\Delta Z$ occurs, the pulse from the one side of the binary 96, occurring at the time of pulse $P_6$ and having a significance of ½, is not returned to the R register since such a return is blocked by a gate 160. The gate 160 is qualified during pulses $P_2$—$P_5$ unconditionally, and is qualified during the pulse $P_6$ unless an increment $\Delta Z_{1/2}$ occurs. If such an increment $\Delta Z_{1/2}$ occurs, the digit in the binary 96 has accounted for an output and is blocked from returning to the R register 70.

Consider now the formation of signals $\Delta Z_1$, indicating a full increment in the output quantity, which occurs in a similar manner to the formation of the signals $\Delta Z_{1/2}$. The signal $\Delta Z_1$ occurs high when the binary 136 is placed in a set state and indicates a full increment in the quantity Z. The binary 136 is set at a time when the gate circuit 144 is fully qualified. The gate circuit 144 is qualified in part at the same time as the gate circuit 138, i.e., at a time when an increment in the independent variable X has occurred, indicating that some value of Y has been added to the content of the R register 70. The remaining portion of the gate circuit 144 will be qualified by the qualification of either of the gate circuits 156 or 158.

The qualification of the gate circuits 156 and 158 is similar to the qualification of the gates 150 and 154; however, one of the gates 156 or 158 is qualified when the summation of the quantities Y and R result in a value equivalent to 1, whereas the gates 150 and 154 indicate such a sum has reached ½. If a value of 1 is reached, it will be manifested by the input to the binary 96 during the pulse $P_6$. This input is shifted in time one digit from the most-significant digit of the value R, and, therefore, represents an overflow of the capacity of the R register 70 and that the quantity R has reached a value of 1.

An increment $\Delta Z_1$ thus occurs when: (1) the value of Y is added to the value R, and (2) the result of the addition causes the new value of R to be equivalent to positive or negative value of 1. The detection of an addition of the quantity Y to the quantity R is made by the gate 144 which receives both the signals $\Delta X_1$ and $\Delta X_{1/2}$. To detect whether the result of the addition exceeds the predetermined value of one, which in this case is the overflow of the capacity of the R register 70, is detected by the gate circuits 156 and 158. If the addition of a complemented value of Y causes the R register to exceed its capacity for registering a complemented value, the gate circuit 158 will be qualified. The qualification of the gate circuit 158 occurs during $P_6$ when the input to the binary 96 is representative of a zero and the output from the gates 118 and 120 is high. When the output from the gates 118 and 120 is high, a complemented value of Y will have been added to the R value, therefore, if the addition of this value causes a zero digit in the position more significant than the most-significant digit of the R register 70, an overflow will be indicated of a negative nature and an output increment $\Delta Z_1$ results.

The gate circuit 156 detects the occurrence of an overflow of the R register in a positive direction. The gate 156 receives a signal from the inverter 130 which is high when the last addition to the value R was positive, and another signal from the input to the one side of the binary 96 which, when high at the time the value registered is uncomplemented, indicates that an overflow of the R register has occurred in a positive direction.

In this manner, the gates 156 and 158 in conjunction with the gate 144 detect the occurrence of full-increment overflows of the value of R and cause the binary 136 to be set. When the binary 136 is set, the signal $\Delta Z_1$ will be high and a full increment in Z will be indicated.

The digit registered in the binary 96, which produces such an output, is prevented from returning to the R register 70 by the gate circuit 160 which is always blocked during the pulse $P_1$.

It is to be noted that a single cycle of integration may never result in the production of both a half and a full increment. If the value of R after a cycle of integration is less than ½, then the output will be zero. If this value reaches ½ but does not reach 1, then a half-increment in Z is produced. If this value exceeds ½ and reaches 1, then a full increment in the output quantity Z results.

It may thus be seen that a digital intergrator is provided which provides output increments of plural magnitudes. A number of such integrators may be interconnected in accordance with the teachings of the prior art to effect the solution of mathematical problems.

It is to be noted that several variations of this system are possible, including that of using a number of reappearing storage registers for the R and Y registers in conjunction with a single system for performing the differential combination.

Therefore, although for the purpose of explaining the invention particular embodiments thereof have been shown and described, obvious modifications will occur to a person skilled in the art, and this invention is not to be limited to the exact details shown and described.

What is claimed is:

1. A digital integrator comprising: a first accumulator for registering the current value of a dependent quantity; parallel signals means for selectively altering the content of said first accumlator under control of different parallel signals carried in said parallel signal means which manifest different variations in said dependent quantity; a second accumulator; transfer means for transferring certain of the contents of said first accumulator to said second accumulator under selective control of parallel signals received by said transfer means manifesting different variations of an independent quantity; and means for selectively forming different parallel output signals manifesting increments of different magnitude in an output quantity in accordance with a digital code, and controlled by the value of signals accumulated in said second accumulator.

2. A digital integrator comprising: a first accumulator for registering the current value of a dependent quantity; parallel signal means for selectively altering the content of said first accumultor under control of different parallel signals carried in said parallel signal means which manifest different variations in said dependent quantity; a second accumulator; transfer means for transferring certain of the contents of said first accumulator to said second accumulator under selective control of parallel signals received by said transfer means manifesting different variations of an independent quantity, said transfer means including parallel signal means to carry said certain of the contents of said first accumulator, which are representative of the product of the contents of said first accumulator and the received variation of an independent quantity; and means for selectively forming different parallel output signals manifesting increments of different magnitude in an output quantity in accordance with a digital code, and controlled by the value of signals accumulated in said second accumulator.

3. A digital integrator for integrating a signal-represented dependent quantity of a mathematical function with respect to an independent quantity comprising: a first accumulator for registering the current value of said dependent quantity; parallel signal means for selectively altering the content of said first accumulator under control of different parallel signals carried in said parallel signal means which manifest different variations in said dependent quantity; a parallel signal path for receiving digital signals representative of different variations in said independent quantity; a second accumulator; signal transfer means coupled to said parallel signal path for registering signals in said second accumulator representative of the product of the contents of said first accumulator and the received variation in said independent quantity, said signal transfer means functioning upon receiving signals from said parallel signal path; and means for selectively forming different parallel output signals manifesting increments of different magnitude in an output quantity in accordance with a digital code, and controlled by the value of signals accumulated in said second accumulator.

4. Apparatus according to claim 3 wherein said parallel signal path carries signals representative of values according to a −1, −½, 0, +½, +1, code.

5. Apparatus according to claim 3 wherein said means for forming different parallel output signals comprises means for forming signals indicative of different threshold values registered in said second accumulator after the occurrence of signals in said parallel signal path.

6. Apparatus according to claim 3 wherein said parallel signal means includes means for receiving parallel signals representative of different variations in said dependent quantity according to a digital code similar to that manifest by signals in said parallel signal path.

7. A digital integrator for receiving first parallel digital signals representing different variations in a dependent quantity of a mathematical function and second parallel digital signals representing different variations in an independent quantity of said mathematical function, to integrate said dependent quantity with respect to said independent quantity, comprising: a first accumulator connected to receive said first signals to register the current value of said dependent quantity; a second accumulator; signal transfer means connected to receive said second signals for transferring third signals to said second accumulator representative of the product of the value registered in said first accumulator and the value represented by said second signals; and means for selectively forming different parallel output signals manifesting increments of different magnitude in an output quantity in accordance with a digital code, and controlled by the value of signals accumulated in said second accumulator.

8. Apparatus according to claim 7 wherein said means for forming different parallel output signals comprises means for forming signals indicative of different threshold values registered in said second accumulator after the occurrence of signals in said parallel signal path.

References Cited in the file of this patent

UNITED STATES PATENTS

| | | |
|---|---|---|
| 2,671,608 | Hirsch | Mar. 9, 1954 |
| 2,725,191 | Ham | Nov. 29, 1955 |
| 2,841,328 | Steele et al. | July 1, 1958 |
| 2,850,232 | Hagen et al | Sept. 2, 1958 |
| 2,852,187 | Beck | Sept. 16, 1958 |
| 2,900,135 | Benaglio et al. | Aug. 18, 1959 |

(Other references on following page)

FOREIGN PATENTS

| | | |
|---|---|---|
| 162,263 | Australia | Mar. 30, 1955 |
| 1,055,460 | France | Oct. 14, 1953 |
| 745,816 | Great Britain | Mar. 7, 1956 |

OTHER REFERENCES

Palevsky: The Design of the Bendix Digital Differential Analyzer, Proc. of the I.R.E., October 1953, pages 1352 to 1356.

Meyer: Digital Techniques in Analog Systems, Transactions of the I.R.E., Elec. Computers, June 1954, pages 23 to 29.

Richards: Arithmetical Operations in Digital Computers, D. Van Nostrand Company, Inc., 1955, pages 101 to 111.